United States Patent [19]
Watts, Jr. et al.

[11] Patent Number: 5,930,516
[45] Date of Patent: Jul. 27, 1999

[54] REAL TIME POWER CONSERVATION FOR COMPUTERS

[75] Inventors: LaVaughn F. Watts, Jr.; Steven J. Wallace, both of Temple, Tex.

[73] Assignee: Texas Instruments Incorporated, Dallas, Tex.

[21] Appl. No.: 08/847,143

[22] Filed: Apr. 30, 1997

Related U.S. Application Data

[63] Continuation of application No. 08/023,831, Apr. 12, 1993, which is a continuation of application No. 07/429,270, Oct. 30, 1989, Pat. No. 5,218,704.

[51] Int. Cl.⁶ .................................................. G06F 1/32
[52] U.S. Cl. ..................................... 395/750.04; 395/560
[58] Field of Search .................................. 395/556, 560, 395/750.04

[56] References Cited

U.S. PATENT DOCUMENTS

| | | |
|---|---|---|
| 3,453,601 | 7/1969 | Bogert et al. . |
| 3,623,017 | 11/1971 | Lowell ................................. 340/172.5 |
| 3,868,647 | 2/1975 | Zandvied ............................. 340/172.5 |
| 3,922,526 | 11/1975 | Cochran ................................... 235/152 |
| 3,941,989 | 3/1976 | McLaughlin et al. . |
| 4,137,563 | 1/1979 | Tsunoda . |
| 4,217,637 | 8/1980 | Faulkner et al. . |
| 4,254,475 | 3/1981 | Cooney et al. . |
| 4,267,577 | 5/1981 | Hashimoto et al. . |
| 4,279,020 | 7/1981 | Christian et al. ........................ 364/707 |
| 4,293,927 | 10/1981 | Hoshii . |
| 4,316,247 | 2/1982 | Iwamoto . |
| 4,317,180 | 2/1982 | Lies ........................................ 364/707 |
| 4,317,181 | 2/1982 | Teza et al. .............................. 364/707 |
| 4,361,873 | 11/1982 | Harper et al. ........................... 364/707 |
| 4,381,552 | 4/1983 | Nocilini et al. . |
| 4,409,665 | 10/1983 | Tubbs et al. . |
| 4,590,553 | 5/1986 | Noda . |
| 4,612,418 | 9/1986 | Takeda et al. ......................... 179/81 R |
| 4,615,005 | 9/1986 | Maejima et al. . |
| 4,670,837 | 6/1987 | Sheets . |
| 4,686,386 | 8/1987 | Tadao ..................................... 307/269 |
| 4,698,748 | 10/1987 | Juzswik et al. . |
| 4,748,559 | 5/1988 | Smith et al. . |
| 4,758,945 | 7/1988 | Remedi . |
| 4,780,843 | 10/1988 | Tietjen . |

(List continued on next page.)

FOREIGN PATENT DOCUMENTS

| | | |
|---|---|---|
| 0 349 726 B1 | 1/1990 | European Pat. Off. .......... G06F 1/00 |
| 0 363 567 B1 | 4/1990 | European Pat. Off. .......... G06F 1/08 |
| 89111349 | 4/1990 | European Pat. Off. . |
| 0 349 726 | 10/1990 | European Pat. Off. . |

OTHER PUBLICATIONS

IBM Technical Disclosure Bulletin, vol. 29, No. 9, pp. 4122–4124, "System Power Savings By Automatic Sleep Mode" Feb. 1997.

*Primary Examiner*—Glenn A. Auve
*Attorney, Agent, or Firm*—Ronald O. Neerings; Robby T. Holland; Richard L. Donaldson

[57] ABSTRACT

A real-time power conservation apparatus and method for portable computers employs a monitor to determine whether a CPU may rest based upon a real-time sampling of the CPU activity level and to activate a hardware selector to carry out the monitor's determination. If the monitor determines the CPU may rest, the hardware selector reduces CPU clock time; if the CPU is to be active, the hardware selector returns the CPU to its previous high speed clock level. Switching back into full operation from its rest state occurs without a user having to request it and without any delay in the operation of the computer while waiting for the computer to return to a "ready" state. Furthermore, the monitor adjusts the performance level of the computer to manage power conservation in response to the real-time sampling of CPU activity. Such adjustments are accomplished within the CPU cycles and do not affect the user's perception of performance and do not affect any system application software executing on the computer.

63 Claims, 7 Drawing Sheets

U.S. PATENT DOCUMENTS

| | | | |
|---|---|---|---|
| 4,814,591 | 3/1989 | Nara et al. | 235/380 |
| 4,819,164 | 4/1989 | Branson . | |
| 4,821,229 | 4/1989 | Jauregui . | |
| 4,823,292 | 4/1989 | Hillion | 364/707 |
| 4,823,309 | 4/1989 | Kusaka et al. . | |
| 4,851,987 | 7/1989 | Day . | |
| 4,870,570 | 9/1989 | Satoh et al. . | |
| 4,893,271 | 1/1990 | Davis et al. . | |
| 4,980,836 | 12/1990 | Carter et al. . | |
| 5,025,387 | 6/1991 | Frane . | |
| 5,083,266 | 1/1992 | Watanabe . | |
| 5,086,387 | 2/1992 | Arroyo et al. . | |
| 5,129,091 | 7/1992 | Yorimoto et al. . | |
| 5,142,684 | 8/1992 | Perry et al. . | |
| 5,167,024 | 11/1992 | Smith . | |
| 5,179,693 | 1/1993 | Kitamura et al. | 395/560 |
| 5,201,059 | 4/1993 | Nguyen . | |
| 5,218,704 | 6/1993 | Watte, Jr. et al. . | |
| 5,560,024 | 9/1996 | Harper et al. | 395/750.04 |

REAL TIME POWER CONSERVATION FOR COMPUTERS

This is a continuation of application Ser. No. 08/023,831, filed Apr. 12, 1993 which is a continuation of U.S. Pat. No. 5,218,704, issued Jun. 8, 1993 (application Ser. No. 07/429,270, filed Oct. 30, 1989.)

BACKGROUND OF THE INVENTION

1. Field of the Invention

This invention relates to real-time computer power conservation, and more particularly to an apparatus and method for reduction of central processing unit (CPU) clock time based on the real-time activity level within the CPU of a portable computer.

2. Description of the Related Art

During the development stages of personal computers, the transportable or portable computer has become very popular. Such portable computer uses a large power supply and really represents a small desktop personal computer. Portable computers are smaller and lighter than a desktop personal computer and allow a user to employ the same software that can be used on a desktop computer.

The first generation "portable" computers only operated from an A/C wall power. As personal computer development continued, battery-powered computers were designed. Furthermore, real portability became possible with the development of new display technology, better disk storage, and lighter components.

However, the software developed was desiged to run on desk top personal computers, with all the features of desk top computers, without regard to battery-powered portable computers that only had limited amounts of power available for short periods of time. No special considerations were made by the software, operating system (MS-DOS), Basic Input/Output System (BIOS), or the third party application software to conserve power usage for these portable computers.

As more and more highly functional software packages were developed, desk top computer users experienced increased performance from the introductions of higher computational CPUs, increased memory, and faster high performance disk drives.

Unfortunately, portable computers continued to run only on A/C power or with large and heavy batteries. In trying to keep up with the performance requirements of the desk top computers, and the new software, expensive components were used to cut the power requirements. Even so, the heavy batteries still did not run very long. This meant users of portable computers had to settle for A/C operation or very short battery operation to have the performance that was expected from the third party software.

Portable computer designers stepped the performance down to 8088- and 8086-type processors to reduce the power consumption. The supporting circuits and CPU took less power to run and therefore, lighter batteries could be used. Unfortunately, the new software requiring 80286-type instructions, that did not exist in the older slower 8088/8086 CPUs, did not run.

In an attempt to design a portable computer that could conserve power, thereby yielding longer battery operation, smaller units, and less weight, some portable computer designers proceeded to reduce power consumption of a portable computer while a user is not using the computer. For example, designers obtain a reduction in power usage by slowing or stopping the disk drive after some predetermined period of inactivity; if the disk drive is not being used, the disk drive is turned off, or simply placed into a standby mods. When the user is ready to use the disk, the operator must wait until the disk drive spins up and the computer system is ready again for full performance before the operator may proceed with the operation.

Other portable computer designers conserve power by turning the computer display off when the keyboard is not being used. However, in normal operation the computer is using full power. In other words, power conservation by this method is practical only when the user is not using the components of the system. It is very likely, however, that the user will turn the computer off when not in use.

Nevertheless, substantial power conservation while the operator is using the computer for meaningful work is needed. When the operator uses the computer, full operation of all components is required. During the intervals while the operator is not using the computer, however, the computer could be turned off or slowed down to conserve power consumption. It is critical to maintaining performance to determine when to slow the computer down or turn it off without disrupting the user's work, upsetting the third party software, or confusing the operating system, until operation is needed.

Furthermore, although an user can wait for the disk to spin up as described above, application software packages cannot wait for the CPU to "spin up" and get ready. The CPU must be ready when the application program needs to compute. Switching to full operation must be completed quickly and without the application program being affected. This immediate transition must be transparent to the user as well as to the application currently active. Delays cause user operational problems in response time and software compatability, as well as general failure by the computer to accurately execute a required program.

Other attempts at power conservation for portable computers include providing a "Shut Down" or "Standby Mode" of operation. The problem, again, is that the computer is not usable by the operator during this period. The operator could just as well turned off the power switch of the unit to save power. This type of power conservation only allows the portable computer to "shut down" and thereby save power if the operator forgets to turn off the power switch, or walks away from the computer for the programmed length of time. The advantage of this type of power conservation over just turning the power switch off/on is a much quicker return to full operation. However, this method of power conservation is still not real-time, intelligent power conservation while the computer is on and processing data which does not disturb the operating system, BIOS, and any third party application programs currently running on the computer.

Some attempt to meet this need was made by VLSI vendors in providing circuits that either turned off the clocks to the CPU when the user was not typing on the keyboard or woke up the computer on demand when a keystroke occurred. Either of these approaches reduce power but the computer is dead (unusable) during this period. Background operations such as updating the system clock, communications, print spooling, and other like operations cannot be performed. Some existing portable computers employ these circuits. After a programmed period of no activity, the computer turns itself off. The operator must turn the machine on again but does not have to reboot the operating system and application program. The advantage of this circuity is, like the existing "shut down" operations, a quick return to full operation without restarting the computer. Nevertheless, this method only reduces power consumption when the user walks away from the machine and does not actually extend the operational life of the battery charge.

SUMMARY OF THE INVENTION

In view of the above problems associated with the related art, it in an object of the present invention to provide an apparatus and method for real-time conservation of power for computer systems without any real-time performance degradation, such conservation of power remaining transparent to the user.

Another object of the present invention is to provide an apparatus and method for predicting the activity level within a computer system and using the prediction for automatic power conservation.

Yet another object of the present invention is to provide an apparatus and method which allows user modification of automatic activity level predictions and using the modified predictions for automatic power conservation.

A further object of the present invention is to provide an apparatus and method for real-time reduction and restoration of clock speeds thereby returning the CPU to full processing rate from a period of inactivity which is transparent to software programs.

These objects are accomplished in a preferred embodiment of the present invention by an apparatus and method which determine whether a CPU may rest based upon the CPU activity level and activates a hardware selector based upon that determination. If the CPU may rest, or sleep, the hardware selector applies oscillations at a sleep clock level; if the CPU is to be active, the hardware selector applies oscillations at a high speed clock level.

The present invention examines the state of CPU activity, as well as the activity of both the operator and any application software program currently active. This sampling of activity is performed real-time, adjusting the performance level of the computer to manage power conservation and computer power. These adjustments are accomplished within the CPU cycles and do not affect the user's perception of performance.

Thus, when the operator for the third party software of the operating system/BIOS is not using the computer, the present invention will effect a quick turn off or slow down of the CPU until needed, thereby reducing the power consumption, and will promptly restore full CPU operation when needed without affecting perceived performance. This switching back into full operation from the "slow down" mode occurs without the user having to request it and without any delay in the operation of the computer while waiting for the computer to return to a "ready" state.

These and other features and advantages of the invention will be apparent to those skilled in the art from the following detailed description of a preferred embodiment, taken together with the accompanying drawings, in which:

DETAILED DESCRIPTION OF A PREFERRED EMBODIMENT

If the period of computer activity in any given system is examined, the CPU and associated components have a utilization percentage. If the user is inputting data from the keyboard, the time between keystrokes is very long in terms of CPU cycles. Many things can be accomplished by the computer during this time, such as printing a report. Even during the printing of a report, time is still available for additional operations such as background updating of a clock/calendar display. Even so, there is almost always spare time when the CPU is not being used. If the computer is turned off or slowed down during this spare time, then power consumption is obtained real-time. Such real-time power conservation extends battery operation life.

According to the preferred embodiment of the present invention, to conserve power under MS-DOS, as well as other operating systems such as OS/2, XENIX, and those for Apple computers, requires a combination of hardware and software. It should be noted that because the present invention will work in any system, while the implementation may vary slightly on a system-by-system basis, the scope of the present invention should therefore not be limited to computer systems operating under MS/DOS.

Slowing down or stopping the computer system components according to the preferred embodiment of the present invention, reduces power consumption, although the amount of power saved may vary. Therefore, according to the present invention, stopping the clock (where possible as some CPUs cannot have their clocks stopped) reduces the power consumption more than just slowing the clock.

In general, the number of operations (or instructions) per second may be considered to be roughly proportional to the processor clock:

$$\text{instructions/second} = \text{instructions/cycle} * \text{cycles/second}$$

Assuming for simplicity that the same instruction is repeatedly executed so that instructions/second is constant, the relationship can be expressed as follows:

$$Fq = K_1 * Clk$$

where Fq is instructions/second, $K_1$ is constant equal to the instructions/cycle, and Clk equals cycles/second. Thus, roughly speaking, the rate of execution increases with the frequency of the CPU clock.

The amount of power being used at any given moment is also related to the frequency of the CPU clock and therefore to the rate of execution. In general this relationship can be expressed as follows:

$$P = K_2 + (K_3 * Clk)$$

where P is power in watts, $K_2$ is a constant in watts, $K_3$ is a constant and expresses the number of watt-seconds/cycle, and Clk equals the cycles/second of the CPU clock. Thus it can also be said that the amount of power being consumed at any given time increases as the CPU clock frequency increases.

Assume that a given time period T is divded into N intervals such that the power P is constant during each interval. Then the amount of energy E expended during T is given by:

$$E=P(1)\text{delta}T_1+P(2)\text{delta}T_2 \ldots +P(N)\text{delta}T_N$$

Further assume that the CPU clock "Clk" has only two states, either "ON" or "OFF". For the purposes of this discussion, the "ON" state represents the CPU clock at its maximum frequency, while the "OFF" state represents the minimum clock rate at which the CPU can operate (this may be zero for CPUs that can have their clocks stopped). For the condition in which the CPU clock is always "ON", each P(i) in the previous equation is equal and the total energy is:

$$E(\max)=P(\text{on}) * (\text{delta } T_1+\text{delta } T_2 \ldots +\text{delta } T_N)=P(\text{on}) * T$$

This represents the maximum power consumption of the computer in which no power conservation measures are being used. If the CPU clock is "off" during a portion of the intervals, then there are two power levels possible for each interval. The P(on) represents the power being consumed when the clock in in its "ON" state, while P(off) represents the power being used when the clock is "OFF". If all of the time intervals in which the clock is "ON" is summed into the quantity "T(on)" and the "OFF" intervals are summed into "T(off)", then it follows:

$$T=T(\text{on})+T(\text{off})$$

Now the energy being used during period T can be written:

$$E=[P(\text{on}) * T(\text{on})]+[P(\text{off}) * T(\text{off})]$$

Under these conditions, the total energy consumed may be reduced by increasing the time intervals T(off). Thus, by controlling the periods of time the clock is in its "OFF" state, the amount of energy being used may be reduced. If the T(off) period is divided into a large number of intervals during the period T, then as the width of each interval goes to zero, energy consumption is at a maximum. Conversely, as the width of the T(off) intervals increase, the energy consumed decreases.

Figure 1:
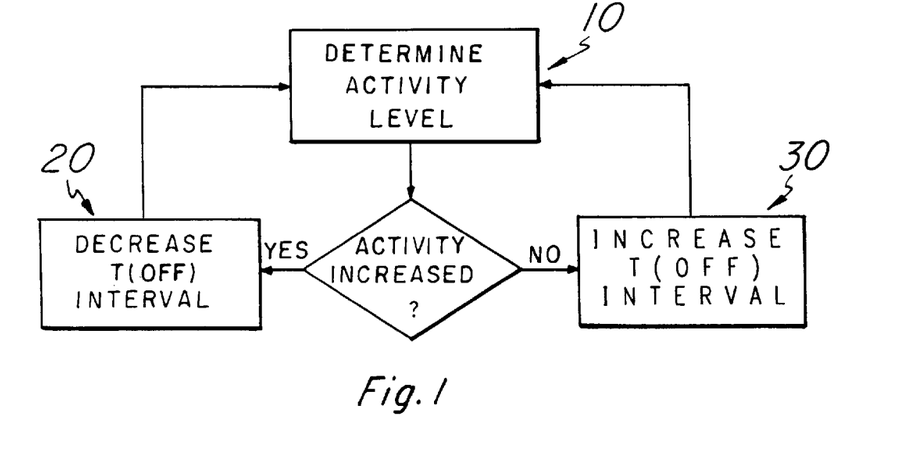
FIG. 1 is a flowchart depicting the self-tuning aspect of a preferred embodiment of the present invention.

If the "OFF" intervals are arranged to coincide with periods during which the CPU is normally inactive, then the user cannot perceive any reduction in performance and overall energy consumption is reduced from the E(max) state. In order to align the T(off) intervals with periods of CPU inactivity, the CPU activity level is used to determine the width of the T(off) intervals in a closed loop. FIG. 1 depicts such a closed loop. The activity level of the CPU is determined at Step 10. If this level is an increase over an immediately previous determination, the present invention decreases the T(off) interval (Step 20) and returns to determine the activity level of the CPU again. If, on the other hand, this activity level is a decrease over an immediately previous determination, the present invention increases the T(off) interval (Step 30) and proceeds to again determine the activity level of the CPU. Thus the T(off) intervals are constantly being adjusted to match the system activity level.

In any operating system, two key logic points exist: an IDLE, or "do nothing", loop within the operating system and an operating system request channel, usually available for services needed by the application software. By placing logic inline with these logic points, the type of activity request made by an application software can be evaluated, power conservation can be activated and slice periods determined. A slice period is the number of T(on) vs. T(off) intervals over time, computed by the activity level. An assumption may be made to determine CPU activity level: Software programs that need service usually need additional services and the period of time between service requests can be used to determine the activity level of any application software running on the computer and to provide slice counts for power conservation according to the present invention.

Once the CPU is interrupted during a power conservation slice (T(off)), the CPU will save the interrupter routine's state prior to vectoring to the interrupt software. Of course, since the power conservation software was operating during this slice, control will be returned to the active power conservation loop (monitor 40) which simply monitors the CPU's clock to determine an exit condition for the power conservation mode, thereby exiting from T(off) to T(on) state. The interval of the next power conservation state is adjusted by the activity level monitored, as discussed above in connection with FIG. 1. Some implementations can create an automatic exit from T(off) by the hardware logic, thereby forcing the power conservation loop to be exited automatically and executing an interval T(on).

Figure 2A:
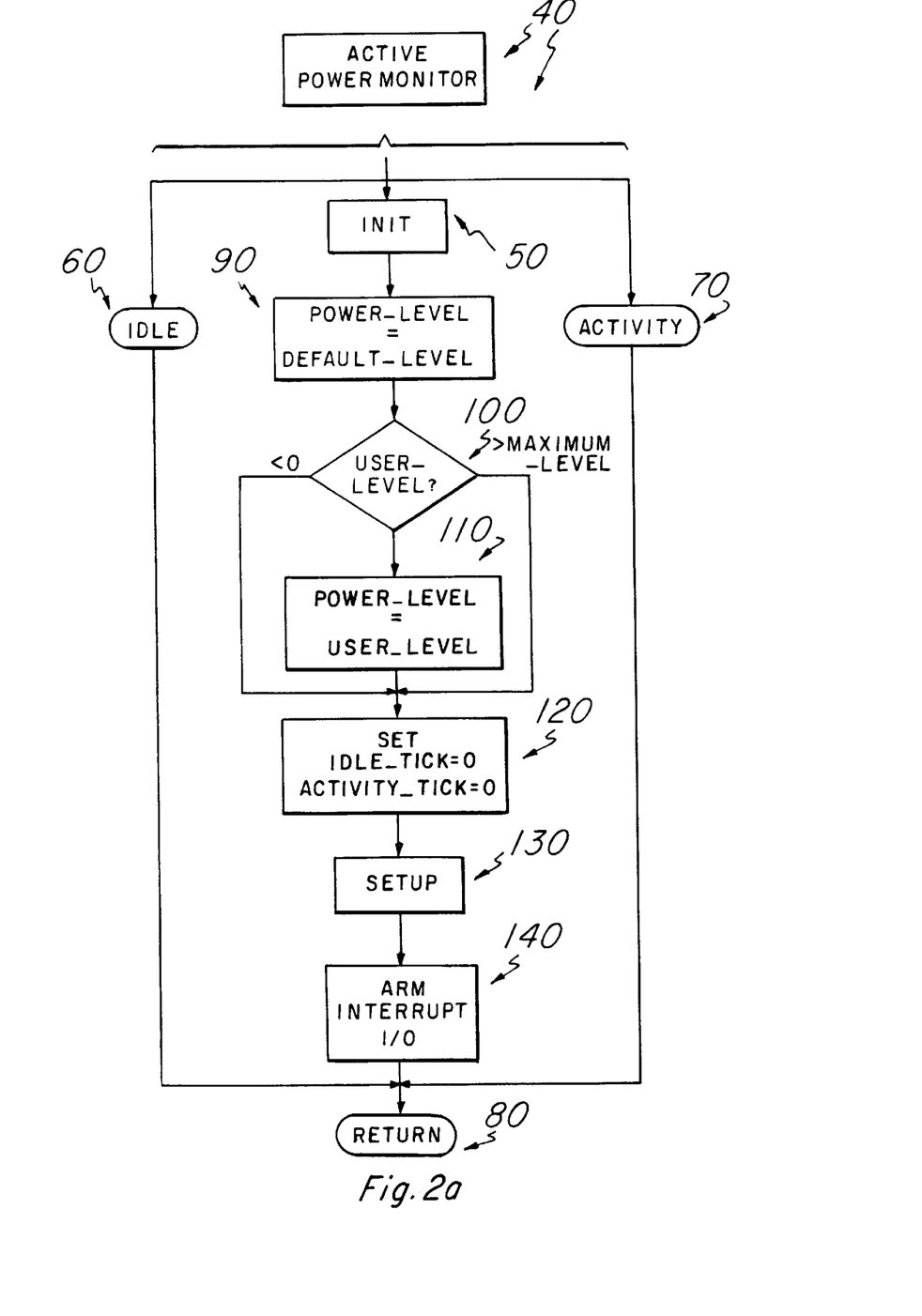
FIGS. 2a–2d are flowcharts depicting the active power conservation monitor employed by the present invention.
Figure 2B:
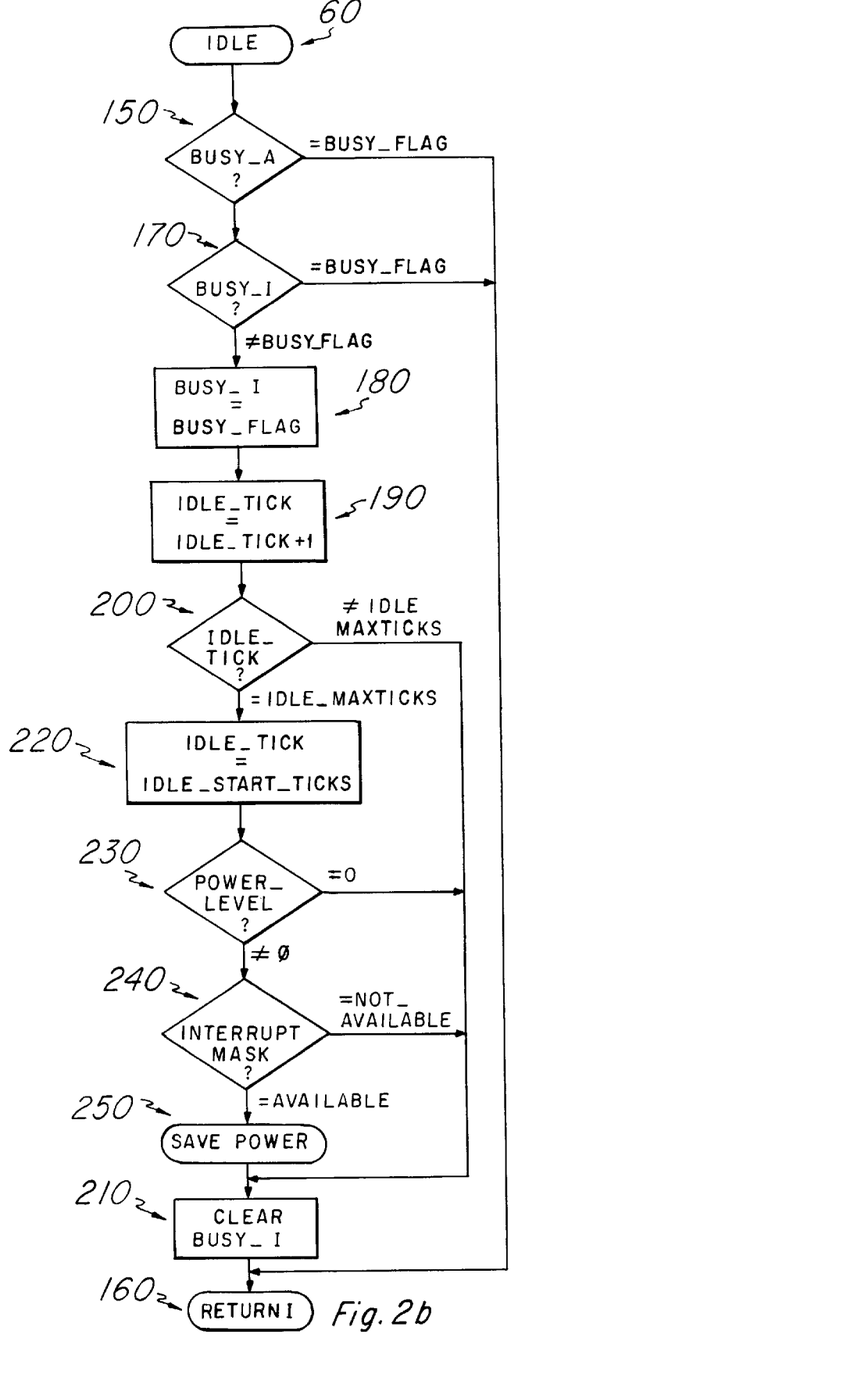
Figure 2C:
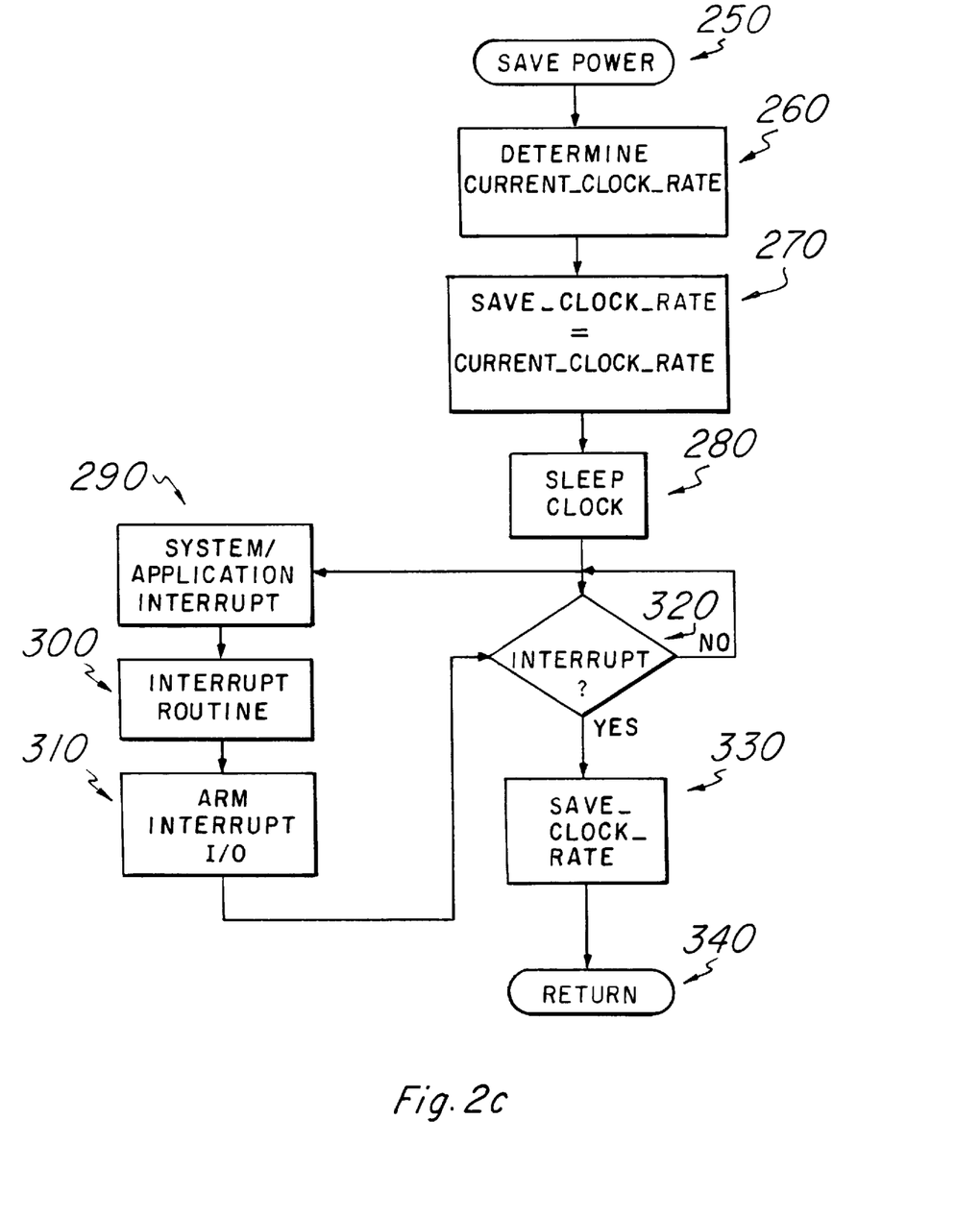
Figure 2D:
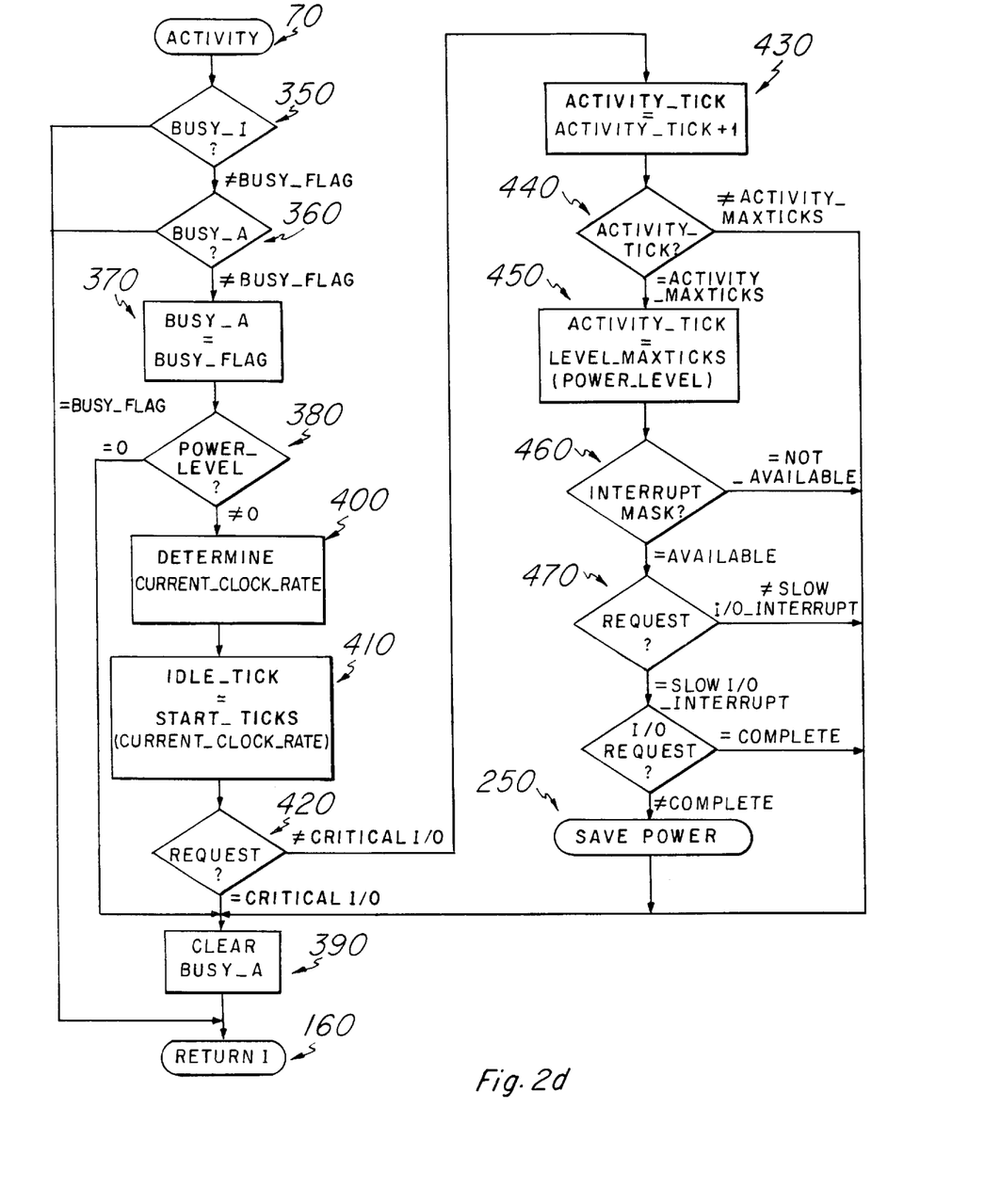

More specifically, looking now at FIGS. 2a–2d, which depict the active power conservation monitor 40 of the present invention. The CPU installs monitor 40 either via a program stored in the CPU ROM or loads it from an external device storing the program in RAM. Once the CPU has loaded monitor 40, it continues to INIT 50 for system interrupt initialization, user configurational setup, and system/application specific initialization. IDLE branch 60 (more specifically set out in FIG. 2b) is executed by a hardware or software interrupt for an IDLE or "do nothing" function (i.e., planned inactivity). The ACTIVITY branch 70 of the flowchart, more fully described below in relation to FIG. 2d, is executed by a software or hardware interrupt due to an operating system or I/O service request, by an application program or internal operating system function. An I/O service request made by a program may, for example, be a disk I/O, read, print, load, etc. Regardless of the branch selected, control is eventually returned to the CPU operating system at RETURN 80. The INIT branch 50 of this flowchart, shown in FIG. 2a, is executed only once if it is loaded via program into ROM or is executed every time during power up if it is loaded from an external device and stored in the RAM. Once this branch of active power monitor 40 has been fully executed, whenever control is yielded from the operating system to the power conservation mode, either IDLE 60 or ACTIVITY 70 branches are selected depending on the type of CPU activity: IDLE branch 60 for power conservation during planned inactivity and ACTIVITY branch 70 for power conservation during CPU activity.

Looking more closely at INIT branch 50, after all system interrupt and variables are initialized, the routine continues at Step 90 to set the Power_level equal to DEFAULT_LEVEL. In operating systems where the user has input control for the Power_level, the program at Step 100 checks to see if a User_level has been selected. If the User_level is less than zero or greater than the MAXIMUM_LEVEL, the system uses the DEFAULT_LEVEL. Otherwise, it continues onto Step 110 where it modifies the Power_level to equal the User_level.

According to the preferred embodiment of the present invention, the system at Step 120 sets the variable Idle_tick to zero and the variable Activity_tick to zero. Under an MS/DOS implementation, Idle_tick refers to the number of interrupts found in a "do nothing" loop. Activity_tick refers to the number of interrupts caused by an activity interrupt which in turn determines the CPU activity level. Tick count represents a delta time for the next interrupt. Idle_tick is a constant delta time from one tick to another (interrupt) unless overwritten by a software interrupt. A software interrupt may reprogram delta time between interrupts.

After setting the variables to zero, the routine continues on to Setup 130 at which time any application specific configuration fine-tuning is handled in terms of system-specific details and the system is initialized. Next the routine arms the interrupt I/0 (Step 140) with instructions to the hardware indicating the hardware can take control at the next interrupt. INIT branch 50 then exits to the operating system, or whatever called the active power monitor originally, at RETURN 80.

Consider now IDLE branch 60 of active power monitor 40, more fully described at FIG. 2b. In response to a planned inactivity of the CPU, monitor 40 (not specifically shown in this Figure) checks to see if entry into IDLE branch 60 is permitted by first determining whether the activity interrupt is currently busy. If Busy_A equals BUSY_FLAG (Step 150), which is a reentry flag, the CPU is busy and cannot now be put to sleep. Therefore, monitor 40 immediately proceeds to RETURN I 160 and exits the routine. RETURN I 160 is an indirect vector to the previous operating system IDLE vector interrupt for normal processing stored before entering monitor 40. (I.e., this causes an interrupt return to the last chained vector.)

If the Busy_A interrupt flag is not busy, then monitor 40 checks to see if the Busy_Idle interrupt flag, Busy_I, equals BUSY_FLAG (Step 170). If so, this indicates the system is already in IDLE branch 60 of monitor 40 and therefore the system should not interrupt itself. If Busy_I=BUSY_FLAG, the system exits the routine at RETURN I indirect vector 160.

If, however, neither the Busy_A reentry flag or the Busy_I reentry flag have been set, the routine sets the Busy_I flag at Step 180 for reentry protection (Busy_I BUSY=BUSY_FLAG). At Step 190 Idle_tick is incremented by one. Idle_tick is the number of T(on) before a T(off) interval and is determined from IDLE interrupts, setup interrupts and from CPU activity level. Idle_tick increments by one to allow for smoothing of events, thereby letting a critical I/O activity control smoothing.

At Step 200 monitor 40 checks to see if Idle_tick equals IDLE_MAXTICKS. IDLE_MAXTICKS is one of the constants initialized in Setup 130 of INIT branch 50, remains constant for a system, and is responsible for self-tuning of the activity level. If Idle_tick does not equal IDLE_MAXTICKS, the Busy_I flag is cleared at Step 210 and exits the loop proceeding to the RETURN I indirect vector 160. If, however, Idle_tick equals IDLE_MAXTICKS, Idle_tick is set equal to IDLE_START_TICKS (Step 220). IDLE_START_TICKS is a constant which may or may not be zero (depending on whether the particular CPU can have its clock stopped). This step determines the self-tuning of how often the rest of the sleep functions may be performed. By setting IDLE_START_TICKS equal to IDLE_MAXTICKS minus one, a continuous T(off) interval is achieved. At Step 230, the Power_level is checked. If it is equal to zero, the monitor clears the Busy_I flag (Step 210), exits the routine at RETURN I 160, and returns control to the operating system so it may continue what it was originally doing before it entered active power monitor 40.

If, however, the Power_level does not equal zero at Step 240, the routine determines whether an interrupt mask is in place. An interrupt mask is set by the system/application software, and determines whether interrupts are available to monitor 40. If interrupts are NOT_AVAILABLE, the Busy_I reentry flag is cleared and control is returned to the operating system to continue what it was doing before it entered monitor 40. Operating systems, as well as application software, can set T(on) interval to yield a continuous T(on) state by setting the interrupt mask equal to NOT_AVAILABLE.

Assuming an interrupt is AVAILABLE, monitor 40 proceeds to the SAVE POWER subroutine 250 which is fully executed during one T(off) period established by the hardware state. (For example, in the preferred embodiment of the present invention, the longest possible interval could be 18 ms, which is the longest time between two ticks or interrupts from the real-time clock.) During the SAVE POWER subroutine 250, the CPU clock is stepped down to a sleep clock level.

Once a critical I/O operation forces the T(on) intervals, the IDLE branch 60 interrupt tends to remain ready for additional critical I/O requests. As the CPU becomes busy with critical I/O, less T(off) intervals are available. Conversely, as critical I/O requests decrease, and the time intervals between them increase, more T(off) intervals are available. IDLE branch 60 is a self-tuning system based on feedback from activity interrupts and tends to provide more T(off) intervals as the activity level slows. As soon as monitor 40 has completed SAVE POWER subroutine 250, shown in FIG. 2c and more fully described below, the Busy_I reentry flag is cleared (Step 210) and control is returned at RETURN I 160 to whatever operating system originally requested monitor 40.

Consider now FIG. 2c, which is a flowchart depicting the SAVE POWER subroutine 250. Monitor 40 determines what the I/O hardware high speed clock is at Step 260. It sets the CURRENT_CLOCK_RATE equal to the relevant high speed clock and saves this value to be used for CPUs with multiple level high speed clocks. Thus, if a particular CPU has 12 MHz and 6 MHz high speed clocks, monitor 40 must determine which high speed clock the CPU is at before monitor 40 reduces power so it may reestablish the CPU at the proper high speed clock when the CPU awakens. At Step 270, the Save_clock_rate is set equal to the CURRENT_CLOCK_RATE determined. Save_clock_rate 270 is not used when there is only one high speed clock for the CPU. Monitor 40 now continues to SLEEPCLOCK 280, where a pulse is sent to the hardware selector (shown in FIG. 3) to put the CPU clock to sleep (i.e., lower or stop its clock frequency). The I/O port hardware sleep clock is at much lower oscillations than the CPU clock normally employed.

At this point either of two events can happen. A system/application interrupt may occur or a real-time clock interrupt may occur. If a system/application interrupt 290 occurs, monitor 40 proceeds to interrupt routine 300, processing the interrupt as soon as possible, arming interrupt I/O at Step 310, and returning to determine whether there has been an interrupt (Step 320). Since in this case there has been an interrupt, the Save_clock_rate is used (Step 330) to determine which high speed clock to return the CPU to and SAVE POWER subroutine 250 is exited at RETURN 340. If, however, a system/application interrupt is not received, the SAVE POWER subroutine 250 will continue to wait until a real-time clock interrupt has occurred (Step 320). Once such an interrupt has occurred, SAVE POWER subroutine 250 reestablishes the CPU at the stored Save-clock-rate. If the sleep clock rate was not stopped, in other words, the sleep clock rate was not zero, control is passed at a slow clock and SAVE POWER subroutine 250 will execute interrupt loop 320 several times. If however, control is passed when the sleep clock rate was zero, in other words, there was no clock, the SAVE POWER subroutine 250 will execute interrupt loop 320 once before returning the CPU clock to the Save_clock_rate 330 and exiting (Step (340)).

Consider now FIG. 2d which is a flowchart showing ACTIVITY branch 70 triggered by an application/system activity request via an operating system service request interrupt. ACTIVITY branch 70 begins with reentry protection. Monitor 40 determines at Step 350 whether Busy_I has been set to BUSY_FLAG. If it has, this means the system is already in IDLE branch 60 and cannot be interrupted. If Busy_I=BUSY_FLAG, monitor 40 exits to RETURN I 160, which is an indirect vector to an old activity vector interrupt for normal processing, via an interrupt vector after the operating system performs the requested service.

If however, the Busy_I flag does not equal BUSY_FLAG, which means IDLE branch 60 is not being accessed, monitor 40 determines at Step 360 if the BUSY_A flag has been set equal to BUSY_FLAG. If so, control will be returned to the system at this point because ACTIVITY branch 70 is already being used and cannot be interrupted. If the Busy_A flag has not been set, in other words, Busy_A does not equal BUSY_FLAG, monitor 40 sets Busy_A equal to BUSY_FLAG at Step 370 so as not to be interrupted during execution of ACTIVITY branch 70. At Step 380 the Power_level is determined. If Power_level equals zero, monitor 40 exits ACTIVITY branch 70 after clearing the Busy_A reentry flag (Stop 390). If however, the Power_level does not equal zero, the CURRENT_CLOCK_RATE of the I/O hardware is next determined. As was true with Step 270 of FIG. 2C, Step 400 of FIG. 2d uses the CURRENT_CLOCK_RATE if there are multiple level high speed clocks for a given CPU. Otherwise, CURRENT_CLOCK_RATE always equals the CPU high speed clock. After the CURRENT_CLOCK_RATE is determined (Step 400), at Step 410 Idle_tick is set equal to the constant START_TICKS established for the previously determined CURRENT_CLOCK_RATE. T(off) intervals are established based on the current high speed clock that is active.

Monitor 40 next determines that a request has been made. A request is an input by the application software running on the computer, for a particular type of service needed. At Step 420, monitor 40 determines whether the request is a CRITICAL I/O. If the request is a CRITICAL I/O, it will continuously force T(on) to lengthen until the T(on) is greater than the T(off), and monitor 40 will exit ACTIVITY branch 70 after clearing the Busy_A reentry flag (Step 390). If, on the other hand, the request is not a CRITICAL I/O, then the Activity_tick is incremented by one at Step 430. It is then determined at Step 440 whether the Activity_tick now equals ACTIVITY_MAXTICKS. Step 440 allows a smoothing from a CRITICAL I/O, and makes the system ready from another CRITICAL I/O during Activity_tick T(on) intervals. Assuming Activity_tick does not equal ACTIVITY_MAXTICKS, ACTIVITY branch 70 is exited after clearing the Busy_A reentry flag (Step 390). If, on the other hand, the Activity_tick equals constant ACTIVITY_MAXTICKS, at Step 450 Activity_tick is set to the constant LEVEL_MAXTICKS established for the particular Power_level determined at Step 380.

Now monitor 40 determines whether an interrupt mask exists (Step 460). An interrupt mask is set by system/application software. Setting it to NOT_AVAILABLE creates a continuous T(on) state. If the interrupt mask equals NOT_AVAILABLE, there are no interrupts available at this time and monitor 40 exits ACTIVITY branch 70 after clearing the Busy_A reentry flag (Step 390). If, however, an interrupt is AVAILABLE, monitor 40 determines at Step 470 whether the request identified at Step 420 was for a SLOW I/O_INTERRUPT. SLOW I/O requests may have a delay until the I/O device becomes "ready". During the "make ready" operation, a continuous T(off) interval may be set up and executed to conserve power. Thus, if the request is not a SLOW I/O_INTERRUPT, ACTIVITY branch 70 is exited after clearing the Busy_A reentry flag (Step 390). If, however, the request is a SLOW I/O_INTERRUPT, and time yet exists before the I/O device becomes "ready", monitor 40 then determines at Step 480 whether the I/O request is COMPLETE (i.e., in I/O device ready?). If the I/O device is not ready, monitor 40 forces T(off) to lengthen, thereby forcing the CPU to wait, or sleep, until the SLOW I/O device is ready. At this point it has time to save power and ACTIVITY branch 70 enters SAVE POWER subroutine 250 previously described in connection with to FIG. 2C. If, however, the I/O request is COMPLETE, control is returned to the operating system subsequently to monitor 40 exiting ACTIVITY branch 70 after clearing Busy_A reentry flag (Step 390).

Self-tuning is inherent within the control system of continuous feedback loops. The software of the present invention can detect when CPU activity is low and therefore when the power conservation aspect of the present invention may be activated. Once the power conservation monitor is activated, a prompt return to full speed CPU clock operation within the interval is achieved so as to not degrade the performance of the computer. To achieve this prompt return to full speed CPU clock operation, the preferred embodiment of the present invention employs some associated hardware.

Figure 3:
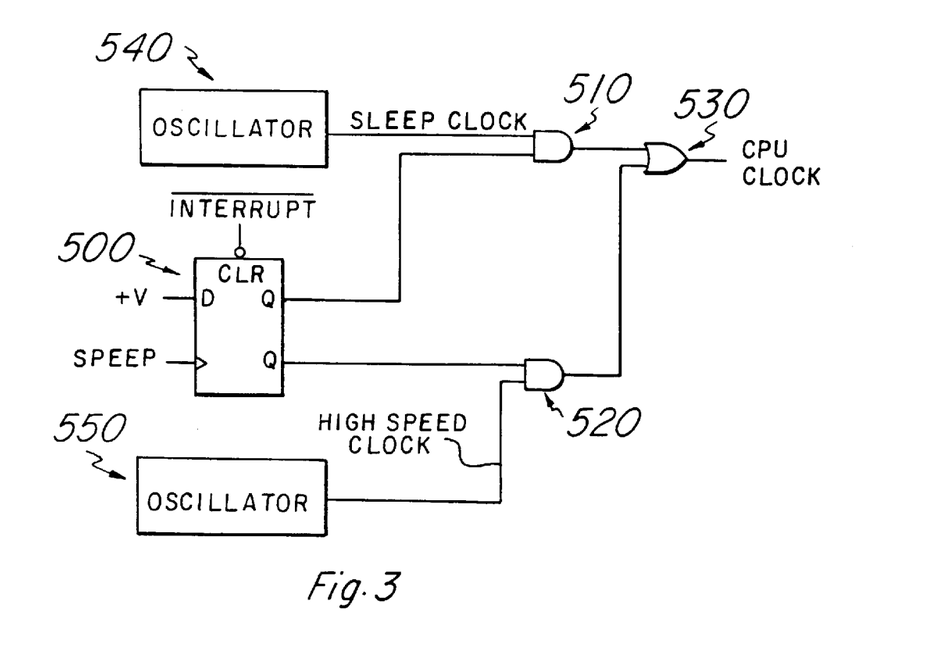
FIG. 3 is a simplified schematic diagram representing the active power conservation associated hardware employed by the present invention.

Looking now at FIG. 3 which shows a simplified schematic diagram representing the associated hardware employed by the present invention for active power conservation. When monitor 40 (not shown) determines the CPU is ready to sleep, it writes to an I/O port (not shown) which causes a pulse on the SLEEP line. The rising edge of this pulse on the SLEEP line causes flip flop 500 to clock a high to Q and a low to Q-. This causes the AND/OR logic (AND gates 510, 520; OR gate 530) to select the pulses travelling the SLEEP CLOCK line from SLEEP CLOCK oscillator 540 to be sent to and used by the CPU CLOCK. SLEEP CLOCK oscillator 540 is a slower clock than the CPU clock used during normal CPU activity. The high coming from the Q of flip flop 500 ANDed (510) with the pulses coming from SLEEP CLOCK oscillator 540 is ORed (530) with the result of the low on the Q- of flip flop 500 ANDed (520) with the pulse generated along the HIGH SPEED CLOCK line by the HIGH SPEED CLOCK oscillator 550 to yield the CPU CLOCK. When the I/O port designates SLEEP CLOCK, the CPU CLOCK is then equal to the SLEEP CLOCK oscillator 540 value. If, on the other hand, an interrupt occurs, an interrupt- value clears flip flop 500, thereby forcing the AND/OR selector (comprising 510, 520 and 530) to choose the HIGH SPEED CLOCK value, and returns the CPU CLOCK value to the value coming from HIGH SPEED CLOCK oscillator 550. Therefore, during any power conservation operation on the CPU, the detection of any interrupt within the system will restore the CPU operation at full clock rate prior to vectoring and processing the interrupt.

It should be noted that the associated hardware needed, external to each of the CPUs for any given system, may be different depending upon the operating system used, whether the CPU can be stopped, etc. Nevertheless, the scope of the present invention should not be limited by possible system specific modifications needed to permit the present invention to actively conserve power in the numerous available portable computer systems. For example two actual implementations are shown in FIGS. 4 and 5, discussed below.

Many VSLI designs today allow for clock switching of the CPU speed. The logic to switch from a null clock or slow clock to a fast clock logic is the same as that which allows the user to change speeds by a keyboard command. The added logic of monitor 40 working with such switching logic, causes an immediate return to a fast clock upon detection of any interrupt. This simple logic is the key to the necessary hardware support to interrupt the CPU and thereby allow the processing of the interrupt at full speed.

The method to reduce power consumption under MS-DOS employs the MS-DOS IDLE loop trap to gain access to the "do nothing" loop. The IDLE loop provides special access to application software and operating system operations that are in a state of IDLE or low activity. Careful examination is required to determine the activity level at any given point within the system. Feedback loops are used from the interrupt 21H service request to determine the activity level. The prediction of activity level is determined by interrupt 21H requests, from which the present invention thereby sets the slice periods for "sleeping" (slowing down or stopping) the CPU. An additional feature allows the user to modify the slice depending on the activity level of interrupt 21H.

Figure 4:
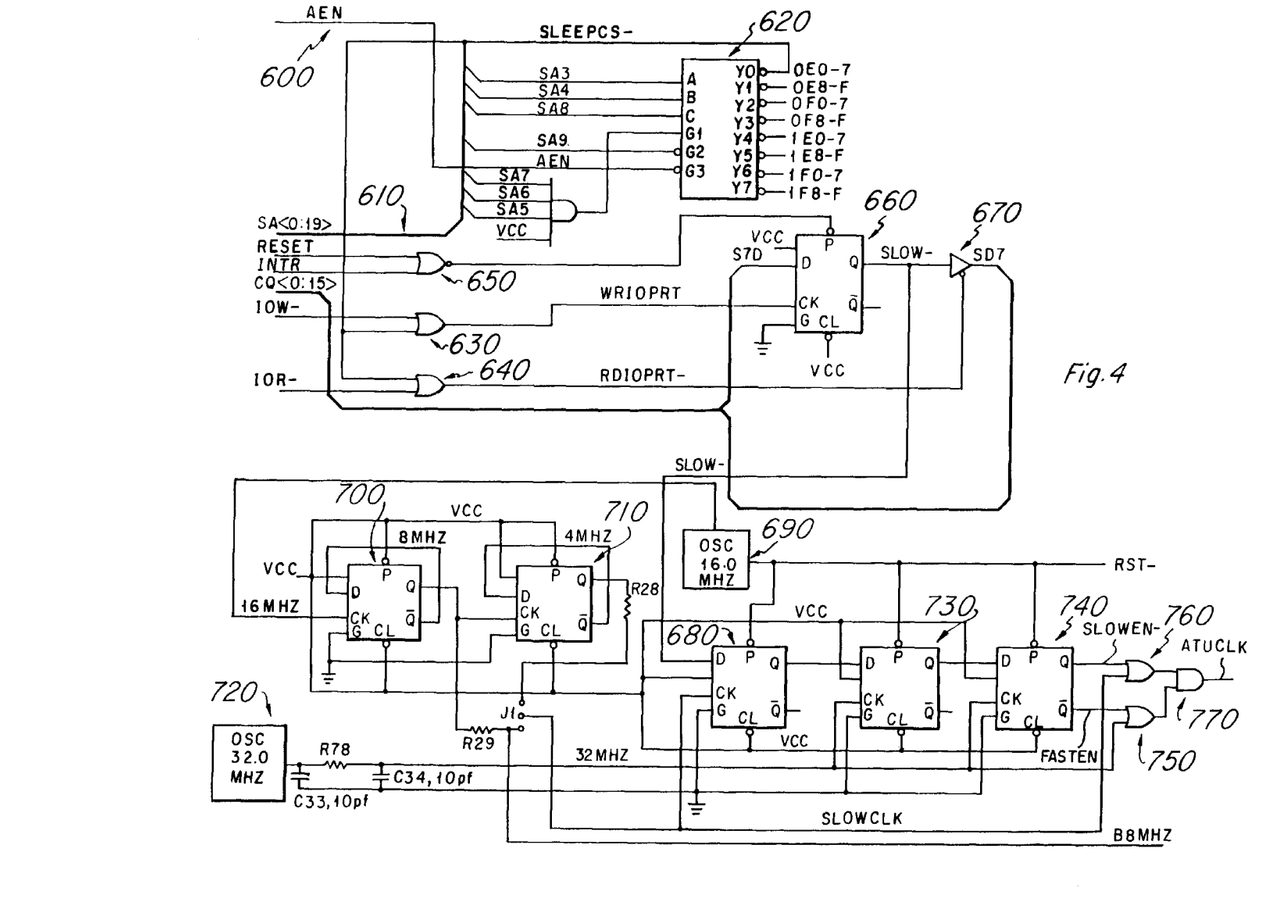
FIG. 4 is a schematic of the sleep hardware for one embodiment of the present invention.
Figure 5:
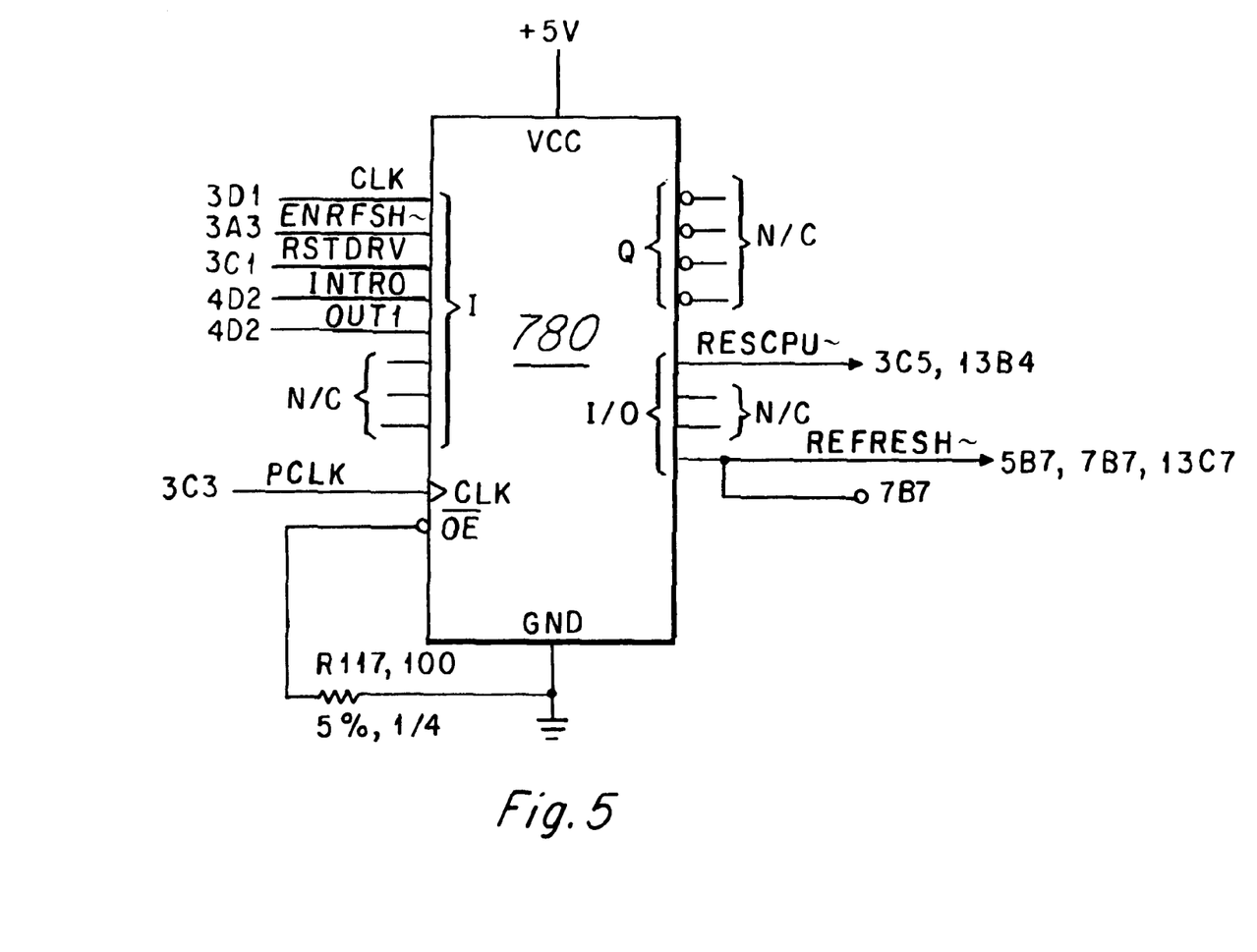
FIG. 5 is a schematic of the sleep hardware for another embodiment of the present invention.

Looking now at FIG. 4, which depicts a schematic of an actual sleep hardware implementation for a system such as the Intel 80386 (CPU cannot have its clock stopped). Address enable bus 600 and address bus 610 provide CPU input to demultiplexer 620. The output of demultiplexer 620 is sent along SLEEPCS- and provided as input to OR gates 630,640. The other inputs to OR gates 630,640 are the I/O write control line and the I/O read control line, respectively. The outputs of these gates, in addition to NOR gate 650, are applied to D flip flop 660 to decode the port. "INTR" is the interrupt input from the I/O port (peripherals) into NOR gate 650, which causes the logic hardware to switch back to the high speed clock. The output of flip flop 660 is then fed, along with the output from OR gate 630, to tristate buffer 670 to enable it to read back what is on the port. All of the above-identified hardware is used by the read/write I/O port (peripherals) to select the power saving "Sleep" operation. The output "SLOW-" is equivalent to "SLEEP" in FIG. 2, and is inputted to flip flop 680, discussed later.

The output of SLEEP CLOCK oscillator 690 is divided into two slower clocks by D flip flops 700,710. In the particular implementation shown in FIG. 4, 16 MHz sleep clock oscillator 690 is divided into 4 MHz and 8 MHZ clocks. Jumper J1 selects which clock is to be the "SLEEP CLOCK".

In this particular implementation, high speed clock oscillator 720 is a 32 MHz oscillator, although this particular speed is not a requirement of the present invention. The 32 MHz oscillator is put in series with a resistor (for the implementation shown, 33 ohms), which is in series with two parallel capacitors (10 pF). The result of such oscillations is tied to the clocks of D flip flops 730,740.

D flip flops 680,730,740 are synchronizing flip flops; 680,730 were not shown in the simplified sleep hardware of FIG. 2. These flip flops are used to ensure the clock switch occurs only on clock edge. As can be seen in FIG. 4, as with flip flop 500 of FIG. 2, the output of flip flop 740 either activates OR gate 750 or OR gate 760, depending upon whether the CPU is to sleep ("FASTEN-") or awaken ("SLOWEN-").

OR gates 750,760 and AND gate 770 are the functional equivalents to the AND/OR selector of FIG. 2. They are responsible for selecting either the "slowclk" (slow clock, also known as SLEEP CLOCK) or high speed clock (designated as 32 MHz on the incoming line). In this implementation, the Slow clock is either 4 MHz or 8 MHz, depending upon jumper J1, and the high speed clock is 32 MHz. The output of AND gate 770 (ATUCLK) establishes the rate of the CPU clock, and is the equivalent of CPU CLOCK of FIG. 2.

Consider now FIG. 5, which depicts a schematic of another actual sleep hardware implementation for a system such as the Intel 80286 (CPU can have its clock stopped). The Western Digital FE3600 VLSI is used for the speed switching with a special external PAL 780 to control the interrupt gating which wakes up the CPU on any interrupt. The software power conservation according to the present invention monitors the interrupt acceptance, activating the next $P(i)\text{deltaT}_i$ interval after the interrupt.

Any interrupt request to the CPU will return the system to normal operation. An interrupt request ("INTRQ") to the CPU will cause the PAL to issue a Wake Up signal on the RESCPU line to the FE3001 (not shown) which in turn enables the CPU and the DMA clocks to bring the system back to its normal state. This is the equivalent of the "INTERRUPT-" of FIG. 2. Interrupt Request is synchronized to avoid confusing the state machine so that Interrupt (INTDET) will only be detected while the cycle is active. The rising edge of RESCPU will wake up the FE 3001 which in turn releases the whole system from the Sleep Mode.

Implementation for the 386SX is different only in the external hardware and software power conservation loop. The software loop will set external hardware to switch to the high speed clock on interrupt prior to vectoring the interrupt. Once return is made to the power conservation software, the high speed clock cycle will be detected and the hardware will be reset for full clock operation.

Implementation for OS/2 uses the "do nothing" loop programmed as a THREAD running in background operation with low priority. Once the THREAD is activated, the CPU sleep, or low speed clock, operation will be activated until an interrupt occurs thereby placing the CPU back to the original clock rate.

Although interrupts have been employed to wake up the CPU in the preferred embodiment of the present invention, it should be realized that any periodic activity within the system, or applied to the system, could also be used for the same function.

While several implementations of the preferred embodiment of the invention has been shown and described, various modifications and alternate embodiments will occur to those skilled in the art. Accordingly, it is intended that the invention be limited only in terms of the appended claims.

We claim:

1. An apparatus, comprising:
    a central processing unit (CPU);
    a monitor for measuring the relative amount of idle time within said CPU; and
    a clock manager coupled to said monitor, said clock manager selectively modifying a clock signal being sent to said CPU to optimize a utilization percentage of said CPU.

2. The apparatus of claim 1, wherein said monitor inhibits the modification of said clock signal while said CPU is processing critical I/O.

3. The apparatus of claim 2, wherein said monitor sends signals to the clock manager requesting the clock manager to demodify the clock signal being sent to the CPU in response to said monitor detecting a critical I/O request.

4. The apparatus of claim 1, wherein said monitor is on board said CPU.

5. The apparatus of claim 1, wherein said monitor is self-tuning.

6. The apparatus of claim 5, wherein said monitor uses a control system of continuous feedback loops.

7. An apparatus, comprising:
a central processing unit (CPU);
a monitor for measuring the relative amount of idle time within said CPU; and
a clock manager coupled to said monitor, said clock manager selectively modifying a clock signal being sent to said CPU in response to a utilization percentage of said CPU being below a preselected level.

8. An apparatus, comprising:
a central processing unit (CPU);
a monitor for measuring the relative amount of idle time within said CPU; and
a clock manager coupled to said monitor, said clock manager selectively modifying a clock signal being sent to said CPU to minimize the amount of idle time in said CPU.

9. The apparatus of claim 8, wherein said clock manager selectively modifies said clock signal by controlling the periods of time a clock generating said clock signal is in an OFF state.

10. The apparatus of claim 9, wherein energy consumption in said CPU is at a maximum when the length of each period of time said clock is in an OFF state is at zero.

11. The apparatus of claim 9, wherein energy consumption in said CPU decreases as the length of each period of time said clock is in an OFF state increases.

12. The apparatus of claim 9, wherein said periods of time said clock is in an OFF state are constantly being adjusted to optimize a utilization percentage of said central processing unit.

13. The apparatus of claim 9, wherein said OFF state represents a minimum clock rate at which said central processing unit can operate.

14. The apparatus of claim 8, wherein a minimum clock rate may be zero for central processing units that can have their clocks stopped.

15. The apparatus of claim 8, wherein said monitor inhibits the modification of said clock signal while said CPU is processing critical I/O.

16. The apparatus of claim 8, wherein said monitor sends signals to the clock manager requesting the clock manager to demodify the clock signal being sent to the CPU in response to said monitor detecting a critical I/O request.

17. The apparatus of claim 8, wherein said monitor is on board said CPU.

18. The apparatus of claim 8, wherein said monitor is self-tuning.

19. The apparatus of claim 18, wherein said monitor uses a control system of continuous feedback loops.

20. An apparatus, comprising:
a central processing unit (CPU);
a monitor for measuring the relative amount of idle time within said CPU; and
a clock manager coupled to said monitor, said clock manager selectively modifying a clock signal being sent to said CPU to minimize the relative amount of idle time in said CPU in response to a utilization percentage of said CPU being below a preselected level.

21. An apparatus, comprising:
a central processing unit (CPU);
a monitor for measuring the relative amount of activity time within said CPU; and
a clock manager coupled to said monitor, said clock manager selectively modifying a clock signal being sent to said CPU to optimize a utilization percentage of said CPU.

22. The apparatus of claim 21, wherein said monitor inhibits the modification of said clock signal while said CPU is processing critical I/O.

23. The apparatus of claim 21, wherein said monitor sends signals to the clock manager requesting the clock manager to demodify the clock signal being sent to the CPU in response to said monitor detecting a critical I/O request.

24. The apparatus of claim 21, wherein said monitor is on board said CPU.

25. The apparatus of claim 21, wherein said monitor is self-tuning.

26. The apparatus of claim 25, wherein said monitor uses a control system of continuous feedback loops.

27. An apparatus, comprising:
a central processing unit (CPU);
a monitor for measuring the relative amount of activity time within said CPU; and
a clock manager coupled to said monitor, said clock manager selectively modifying a clock signal being sent to said CPU in response to a utilization percentage of said CPU being below a preselected level.

28. An apparatus, comprising:
a central processing unit (CPU);
a monitor for measuring the relative amount of activity time within said CPU; and
a clock manager coupled to said monitor, said clock manager selectively modifying a clock signal being sent to said CPU to optimize the activity time in said CPU.

29. The apparatus of claim 28, wherein said clock manager selectively modifies said clock signal by controlling the periods of time a clock generating said clock signal is in an OFF state.

30. The apparatus of claim 29, wherein energy consumption in said CPU is at a maximum when the length of each period of time said clock is in an OFF state is at zero.

31. The apparatus of claim 29, wherein energy consumption in said CPU decreases as the length of each period of time said clock is in an OFF state increases.

32. The apparatus of claim 29, wherein said periods of time said clock is in an OFF state are constantly being adjusted to optimize a utilization percentage of said central processing unit.

33. The apparatus of claim 29, wherein said OFF state represents a minimum clock rate at which said central processing unit can operate.

34. The apparatus of claim 28, wherein a minimum clock rate may be zero for central processing units that can have their clocks stopped.

35. The apparatus of claim 28, wherein said monitor inhibits the modification of said clock signal while said CPU is processing critical I/O.

36. The apparatus of claim 28, wherein said monitor sends signals to the clock manager requesting the clock manager to demodify the clock signal being sent to the CPU in response to said monitor detecting a critical I/O request.

37. The apparatus of claim 28, wherein said monitor is on board said CPU.

38. The apparatus of claim 28, wherein said monitor is self-tuning.

39. The apparatus of claim 38, wherein said monitor uses a control system of continuous feedback loops.

40. An apparatus, comprising:
a central processing unit (CPU);
a monitor for measuring the relative amount of activity time within said CPU; and
a clock manager coupled to said monitor, said clock manager selectively modifying a clock signal being sent to said CPU to optimize the activity time within said CPU in response to a utilization percentage of said CPU being below a preselected level.

41. An apparatus, comprising:
a central processing unit (CPU);
a monitor for measuring the relative amount of idle time and activity time within said CPU; and
a clock manager coupled to said monitor, said clock manager selectively modifying a clock signal being sent to said CPU to optimize a utilization percentage of said CPU.

42. An apparatus, comprising:
a central processing unit (CPU);
a monitor for measuring the relative amount of idle time and activity time within said CPU; and
a clock manager coupled to said monitor, said clock manager selectively modifying a clock signal being sent to said CPU in response to a utilization percentage of said CPU being below a preselected level.

43. An apparatus, comprising:
a central processing unit (CPU);
a monitor for measuring the relative amount of idle time and activity time within said CPU; and
a clock manager coupled to said monitor, said clock manager selectively modifying a clock signal being sent to said CPU to minimize the amount of idle time and optimize the activity time in said CPU.

44. The apparatus of claim 43, wherein said clock manager selectively modifies said clock signal by controlling the periods of time a clock generating said clock signal is in an OFF state.

45. The apparatus of claim 44, wherein energy consumption in said CPU is at a maximum when the length of each period of time said clock is in an OFF state is at zero.

46. The apparatus of claim 44, wherein energy consumption in said CPU decreases as the length of each period of time said clock is in an OFF state increases.

47. The apparatus of claim 44, wherein said periods of time said clock is in an OFF state are constantly being adjusted to optimize a utilization percentage of said central processing unit.

48. The apparatus of claim 44, wherein said OFF state represents a minimum clock rate at which said central processing unit can operate.

49. The apparatus of claim 43, wherein a minimum clock rate may be zero for central processing units that can have their clocks stopped.

50. The apparatus of claim 43, wherein said monitor inhibits the modification of said clock signal while said CPU is processing critical I/O.

51. The apparatus of claim 43, wherein said monitor sends signals to the clock manager requesting the clock manager to demodify the clock signal being sent to the CPU in response to said monitor detecting a critical I/O request.

52. The apparatus of claim 43, wherein said monitor is on board said CPU.

53. The apparatus of claim 43, wherein said monitor is self-tuning.

54. The apparatus of claim 53, wherein said monitor uses a control system of continuous feedback loops.

55. An apparatus, comprising:
a central processing unit (CPU);
a monitor for measuring the relative amount of idle time and activity time within said CPU; and
a clock manager coupled to said monitor, said clock manager selectively modifying a clock signal being sent to said CPU to minimize the amount of idle time and optimize the activity time in said CPU in response to a utilization percentage of said CPU being below a preselected level.

56. An apparatus, comprising:
a central processing unit (CPU);
a monitor for measuring the utilization of said CPU; and
a clock manager coupled to said monitor, said clock manager selectively modifying a clock signal being sent to said CPU to optimize a utilization percentage of said CPU.

57. An apparatus, comprising:
a central processing unit (CPU) coupled to a clock;
means for monitoring the relative amount of idle time and activity time within said CPU; and
means, responsive to said monitoring means, for controlling periods of time said clock is in an OFF state, the length of said periods of time said clock is in an OFF state being appropriate to allow said CPU to operate at an optimized utilization percentage.

58. An apparatus, comprising:
a central processing unit (CPU) coupled to a clock;
a monitor for measuring the relative amount of idle time and activity time within said CPU; and
a clock manager coupled to said monitor, said clock manager controlling periods of time said clock is in an OFF state, the length of said periods of time said clock is in an OFF state being appropriate to allow said CPU to operate at an optimized utilization percentage.

59. The apparatus of claim 58, wherein energy consumption in said CPU is at a maximum when the length of each period of time said clock is in an OFF state is at zero.

60. The apparatus of claim 58, wherein energy consumption in said CPU decreases as the length of each period of time said clock is in an OFF state increases.

61. The apparatus of claim 58, wherein said periods of time said clock is in an OFF state are constantly being adjusted to optimize said utilization percentage of said central processing unit.

62. The apparatus of claim 58, wherein said OFF state represents the minimum clock rate at which said central processing unit can operate.

63. The apparatus of claim 58, wherein a minimum clock rate may be zero for central processing units that can have their clocks stopped.

* * * * *